US012609607B2

(12) United States Patent
Lee et al.

(10) Patent No.: US 12,609,607 B2
(45) Date of Patent: Apr. 21, 2026

(54) ELECTRONIC APPARATUS FOR SUPPLYING POWER AND CONTROL METHOD THEREOF

(71) Applicant: SAMSUNG ELECTRONICS CO., LTD., Suwon-si (KR)

(72) Inventors: Jinhyung Lee, Suwon-si (KR); Wooseok Jang, Suwon-si (KR); Keonwoo Kim, Suwon-si (KR); Moonyoung Kim, Suwon-si (KR); Haedeun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 18/244,652

(22) Filed: Sep. 11, 2023

(65) Prior Publication Data

US 2024/0113616 A1 Apr. 4, 2024

Related U.S. Application Data

(63) Continuation of application No. PCT/KR2023/009590, filed on Jul. 6, 2023.

(30) Foreign Application Priority Data

Oct. 4, 2022 (KR) ........................ 10-2022-0126601

(51) Int. Cl.
*H02M 1/42* (2007.01)
*H02M 1/44* (2007.01)
*H02M 3/158* (2006.01)
(52) U.S. Cl.
CPC ........... *H02M 1/4225* (2013.01); *H02M 1/44* (2013.01); *H02M 3/158* (2013.01)

(58) Field of Classification Search
CPC .................................................. H02M 1/4225
See application file for complete search history.

(56) References Cited

U.S. PATENT DOCUMENTS 8,345,456 B2 1/2013 Nishikawa
8,379,419 B2 2/2013 Yabuzaki et al.
(Continued)

FOREIGN PATENT DOCUMENTS

JP 2010-114993 A 5/2010
JP 5136364 B2 2/2013
(Continued)

OTHER PUBLICATIONS

International Search Report (PCT/ISA/210) issued by the International Searching Authority on Oct. 26, 2023 in corresponding International Application No. PCT/KR2023/009590.
(Continued)

*Primary Examiner* — Peter M Novak
(74) *Attorney, Agent, or Firm* — Sughrue Mion, PLLC

(57) ABSTRACT

An electronic apparatus, including an electromagnetic interference (EMI) filter; a bridge diode connected to an output terminal of the EMI filter; and a power factor correction (PFC) connected to an output terminal of the bridge diode, and including a PFC integrated circuit (IC), wherein the PFC IC is configured to control an inductor current which flows in an inductor included in the PFC is maintained to be less than or equal to a predetermined current value, and wherein the predetermined current value is smaller than a current value of a current which flows in the inductor based on a peak voltage being applied to the PFC.

15 Claims, 14 Drawing Sheets

(56) References Cited

U.S. PATENT DOCUMENTS

| | | | |
|---|---|---|---|
| 9,048,749 B2 | 6/2015 | Joo et al. | |
| 9,525,335 B2 | 12/2016 | Xie et al. | |
| 10,158,282 B1 | 12/2018 | Maruyama | |
| 2010/0110739 A1 | 5/2010 | Nishikawa | |
| 2011/0122664 A1 | 5/2011 | Yabuzaki et al. | |
| 2011/0216565 A1* | 9/2011 | Mi | H02M 1/4225 |
| | | | 363/126 |
| 2012/0201063 A1* | 8/2012 | Sugawara | H02M 1/4225 |
| | | | 363/89 |
| 2014/0042992 A1 | 2/2014 | Takata | |
| 2014/0117960 A1 | 5/2014 | Boling | |
| 2015/0002109 A1 | 1/2015 | Bianco | |
| 2018/0367029 A1 | 12/2018 | Maruyama | |

FOREIGN PATENT DOCUMENTS

| | | |
|---|---|---|
| JP | 5442525 B2 | 3/2014 |
| JP | 5573454 B2 | 8/2014 |
| JP | 2019-4577 A | 1/2019 |
| JP | 6904079 B2 | 7/2021 |
| KR | 10-1141375 B1 | 5/2012 |
| KR | 10-1141673 B1 | 5/2012 |
| KR | 10-1301553 B1 | 9/2013 |
| KR | 10-2083301 B1 | 3/2020 |
| KR | 10-2022-0012729 A | 2/2022 |

OTHER PUBLICATIONS

Written Opinion (PCT/ISA/237) issued by the International Searching Authority on Oct. 26, 2023 in corresponding International Application No. PCT/KR2023/009590.

Communication dated Oct. 9, 2025, issued by the European Patent Office in counterpart European Application No. 23875009.5.

Lee et al., "Current stress minimizing control scheme for power factor correction ( PFC ) boost pre- regulator", Power Electronics, 2007. ICPE '07. 7TH International Conference On, IEEE, Piscataway, NJ, USA, Oct. 22, 2007 (Oct. 22, 2007), pages ,1003-1006, XP031367208, DOI: 10.1109/ICPE.2007.4692533.

Fernandes et al., "A Multimode 1-MHz PFC Front End With Digital Peak Current Modulation", IEEE Transactions On Power Electronics, Institute of Electrical and Electronics Engineers, USA, vol. 31, No. 8, Aug. 1, 2016 (Aug. 1, 2016), pp. 5694-5708, XP011601238, ISSN: 0885-8993, DOI: 10.1109/TPEL.2015.2499194.

* cited by examiner $V_{out}$ $V_{ac}$

<u>100</u>

Inductor Current

Inductor Peak Current
Input Voltage

Current Limit

Gating
Signal $t_{on}$ $t_{on}$ $t_{on}$ $t_{on}$ $t_{on}$ $t_{on}$ $t_{on}$ $t_{on}$ $t_{on}$ $t_{on}$ $t_{on}$ $t_{on}$

FREQUENCY/CURRENT/VOLTAGE OF CURRENT CRM PFC

FREQUENCY/CURRENT/VOLTAGE OF ADAPTIVE PFC

ELECTRONIC APPARATUS FOR SUPPLYING POWER AND CONTROL METHOD THEREOF

CROSS-REFERENCE TO RELATED APPLICATION

This application is a continuation of PCT/KR2023/009590, filed on Jul. 6, 2023, at the Korean Intellectual Property Receiving Office and claims priority under 35 U.S.C. § 119 to Korean Patent Application No. 10-2022-0126601, filed on Oct. 4, 2022, in the Korean Intellectual Property Office, the disclosure of which is incorporated by reference herein in its entirety.

BACKGROUND

Field

This disclosure relates to an electronic apparatus and a control method thereof and, more specifically, to an electronic apparatus for supplying power and a control method thereof.

Description of the Related Art

Development of electronic technology has led to development of various types of electronic apparatuses. In particular, electronic apparatuses with significant power consumption have been recently developed, such as a television (TV) having a large screen.

An electronic apparatus such as these may include a power circuit, and the power circuit may supply power to each component of the electronic apparatus and simultaneously satisfy power factor regulation and harmonic regulation through a power factor correction (PFC) converter.

Therefore, the efficiency of the PFC converter may be an important factor in an issue of power consumption.

SUMMARY

Provided are an electronic apparatus capable of improving power factor correction (PFC) and reducing an inductor and a manufacturing method thereof.

Additional aspects will be set forth in part in the description which follows and, in part, will be apparent from the description, or may be learned by practice of the presented embodiments.

In accordance with an aspect of the disclosure, an electronic apparatus includes an electromagnetic interference (EMI) filter; a bridge diode connected to an output terminal of the EMI filter; and a power factor correction (PFC) connected to an output terminal of the bridge diode, and including a PFC integrated circuit (IC), wherein the PFC IC is configured to control an inductor current which flows in an inductor included in the PFC is maintained to be less than or equal to a predetermined current value, and wherein the predetermined current value is smaller than a current value of a current which flows in the inductor based on a peak voltage being applied to the PFC.

The PFC IC may be further configured to control the inductor current by controlling a transistor included in the PFC according to the inductor current.

The electronic apparatus may further include: a sensing resistor connected between the bridge diode and the PFC, and the PFC IC may be further configured to: turn off the transistor based on the inductor current increasing and a voltage of the sensing resistor reaching a predetermined voltage value corresponding to the predetermined current value; and turn on the transistor based on the inductor current decreasing and the voltage of the sensing resistor reaching zero.

The electronic apparatus may further include: a direct current to direct current (DC/DC) converter connected to an output terminal of the PFC; and a feedback circuit configured to detect an output voltage of the PFC and change the voltage of the sensing resistor based on the output voltage of the PFC decreasing below an allowed input range of the DC/DC converter.

The feedback circuit may be further configured to decrease the voltage of the sensing resistor based on the output voltage of the PFC decreasing to be less than or equal to the allowed input range, and the PFC IC may be further configured to increase a turn-on time of the transistor as the voltage of the sensing resistor decreases.

The feedback circuit may further include: a sensing circuit configured to output an output value, and to change the output value to a second output value from a first output value based on the output voltage of the PFC decreasing; and a variable voltage circuit configured to change the voltage of the sensing resistor based on the output value.

The PFC IC may be further configured to control the PFC to maintain the inductor current to be less than or equal to the predetermined current value by changing a turn-on time of a gate of a transistor included in the PFC.

The PFC IC may be further configured to: based on the inductor current reaching the predetermined current value during a first time interval from among a plurality of time intervals in which a gate of a transistor included in the PFC is turned on, maintain an output voltage of the PFC at a predetermined voltage by increasing a turn-on time of the gate of the transistor included in the PFC during a second time interval from among the plurality of time intervals.

The output voltage of the PFC may decrease based on the turn-on time of the gate reaching a turn-on limit time.

The PFC may further include a transistor, a diode, and a capacitor, a first end of the inductor may be connected to the output terminal of the bridge diode, a drain of the transistor may be connected to a second end of the inductor, and a source of the transistor is grounded; an anode of the diode may be connected to the second end of the inductor; and a first end of the capacitor may be connected to a cathode of the diode, and a second end of the capacitor is grounded.

In accordance with an aspect of the disclosure, a method of controlling an electronic apparatus includes sensing an inductor current which flows in an inductor included in a power factor correction (PFC) of the electronic apparatus, by a PFC integrated circuit (IC) included in the PFC; and controlling, by the PFC IC, the inductor current is maintained to be less than or equal to a predetermined current value, wherein the predetermined current value is smaller than a current value of a current which flows in the inductor based on a peak voltage being applied to the PFC.

The controlling of the inductor current may further include controlling a transistor included in the PFC according to the current flowing in the inductor.

The controlling of the transistor may further include: turning off the transistor based on the inductor current increasing and a voltage of a sensing resistor reaching a predetermined voltage value corresponding to the predetermined current value; and turning on the transistor based on the inductor current decreasing and the voltage of the sensing resistor reaching zero.

The method may further include: detecting an output voltage of the PFC; and changing the voltage of the sensing resistor based on output voltage of the PFC decreasing below an allowed input range of a direct current to direct current (DC/DC) converter.

The changing may further include decreasing the voltage of the sensing resistor based on the output voltage of the PFC decreasing to be less than or equal to the allowed input range, and the controlling may further include increasing a turn-on time of the transistor as the voltage as the sensing resistor decreases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
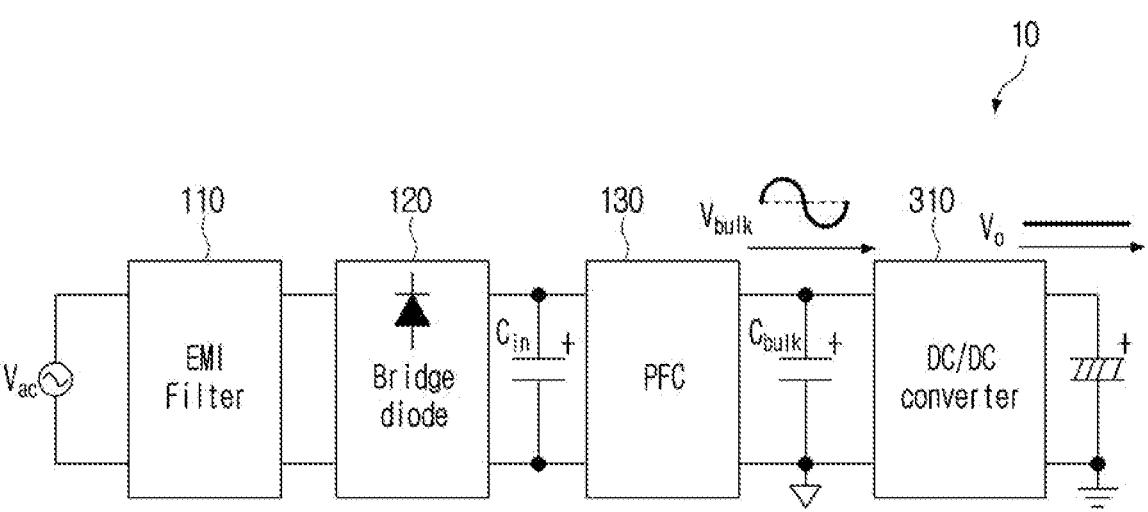
FIGS. 1A to 1E are diagrams illustrating an operation of a power factor correction (PFC), according to an embodiment.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions may not be described in detail where doing so may obscure the disclosure with unnecessary detail.

Embodiments may relate to an electronic apparatus capable of improving power factor correction (PFC) and reducing an inductor and a manufacturing method thereof.

Embodiments are described below in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

In this specification, the expressions "have," "may have," "include," or "may include" or the like represent presence of a corresponding feature (for example: components such as numbers, functions, operations, or parts) and does not exclude the presence of additional feature.

The expression "at least one of A or/a B" should be understood to represent "A" or "B" or any one of "A and B."

As used herein, the terms "first," "second," or the like may denote various components, regardless of order and/or importance, and may be used to distinguish one component from another, and does not limit the components.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, example embodiments of the disclosure are described in detail with reference to the accompanying drawings.

FIGS. 1A to 1E are diagrams illustrating an operation of a power factor correction (PFC) for assisting in understanding of the disclosure. As illustrated in FIG. 1, the electronic apparatus 10 may include an electromagnetic interference (EMI) filter 110, a bridge diode 120, and a PFC 130. In addition, the electronic apparatus 10 may further include a direct current to direct current (DC/DC) converter 310 connected to an output terminal of the PFC.

As illustrated in FIG. 1A, for power circuits of, for example, 75 W or more, a power factor correction (PFC) may be used to satisfy conditions for power factor regulation and harmonic wave regulation.

Figure 1B:
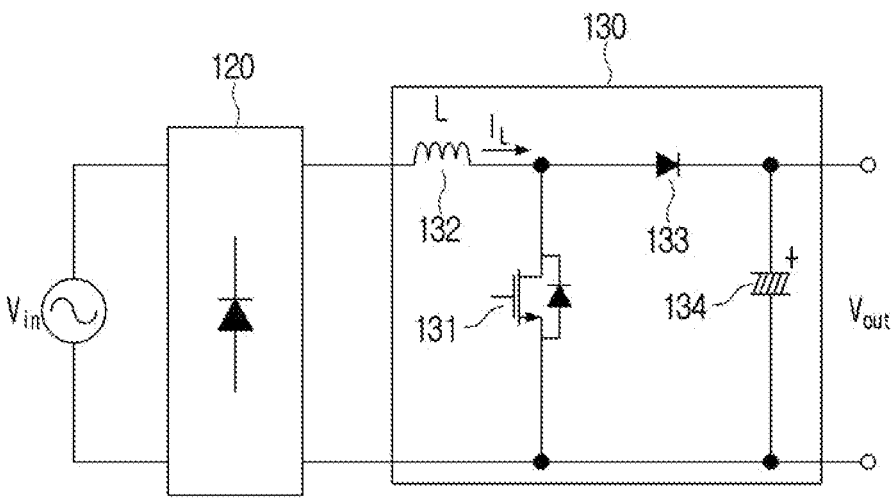
Figure 1C:
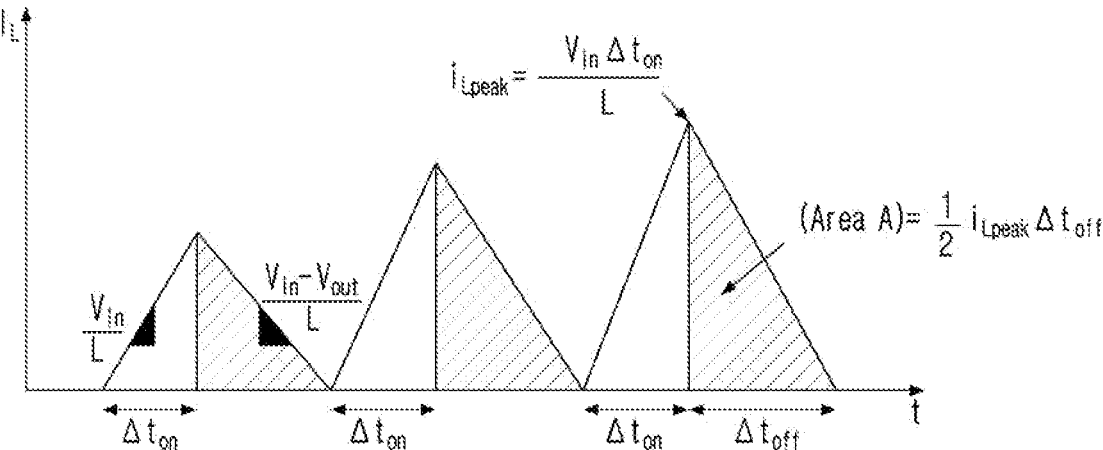

FIGS. 1B and 1C show circuits and operating waveforms of a critical conduction mode (CRM) boost PFC. As shown in FIGS. 1B and 1C, when the input voltage and the load current are constant, the on time $\Delta t_{on}$ of the transistor 131 has a fixed value, and the current rises at a slope of $V_{in}/L$ during $\Delta t_{on}$. In embodiments, the transistor 131 may be a field effect transistor (FET), but embodiments are not limited thereto. The maximum value of the current flowing in the inductor included in the PFC is $(V_{in} \cdot \Delta t_{on})/L$, and the current falls with the slope of $(V_{in}+V_{out})/L$ during $\Delta t_{off}$. Accordingly, the slope and the operating frequency of the inductor current may operate depending on the input voltage.

For example, the PFC 130 may be designed to control the output for 90-264 volts alternating current (VAC) because the input voltage $V_{ac}$ may be different for different applications, for example in devices used in different countries. In this case, as the input current increases in the case of the low alternating current (AC) input voltage (90 to 120 VAC), efficiency and temperature characteristics may deteriorate, and the PFC may be designed based on the corresponding operation point.

Figure 1D:
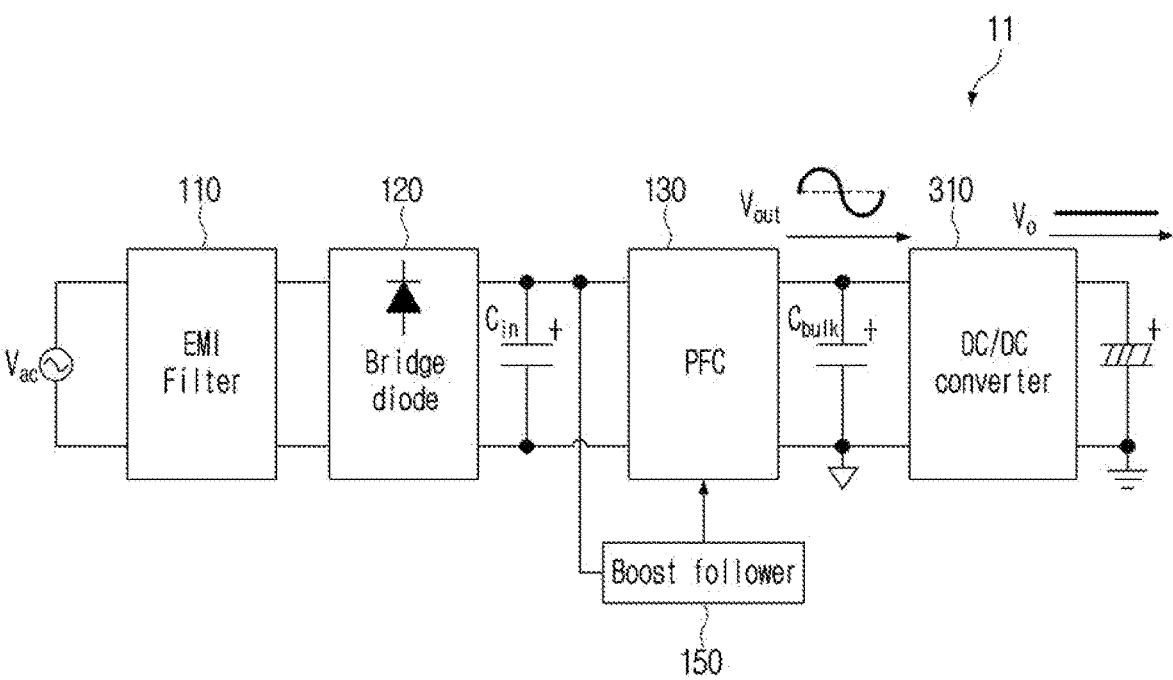
Figure 1E:
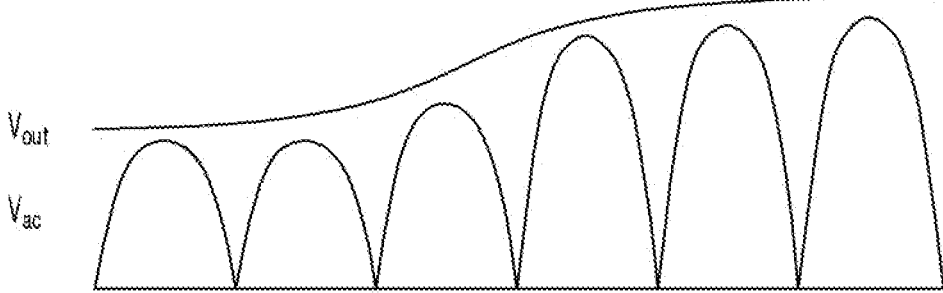

A boost follower 150 may be added, as shown in the electronic apparatus 11 illustrated in FIG. 1D, to maintain an operation at a high AC input voltage with good characteristics and improve operating characteristics in low AC input voltage region. The boost follower 150 may adjust an output voltage by sensing an input voltage and changing a feedback voltage level. Specifically, as shown in FIG. 1E, it may be a basic operation that an output voltage is adjusted along with input voltage and follows. When the input voltage of the PFC 130 is low, the PFC output voltage $V_{out}$ may be set to be low, and when the input voltage of the PFC 130 is high, a high output voltage $V_{out}$ may be maintained in the same manner as the existing PFC. In the low AC input voltage region, because the output voltage $V_{out}$ is low, the switching frequency of the PFC operation may be lowered, thereby reducing loss in the transistor 131. In the meantime, a ripple current flowing in the capacitor $C_{bulk}$ may be increased compared to related-art implementations as the current increases as much as the decreased voltage in generating the same output power. In addition, the loss of the transistor 131 may be reduced, but there may be a limitation in that an inductor 132 may be designed to be the same as that of related-art implementations.

Figure 2:
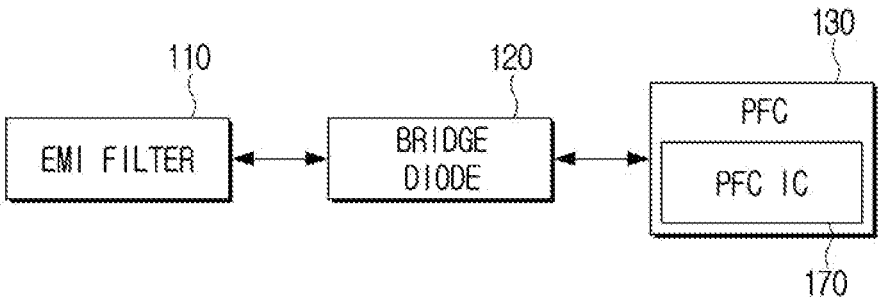
FIG. 2 is a block diagram illustrating a configuration of an electronic apparatus according to an embodiment.
Figure 3:
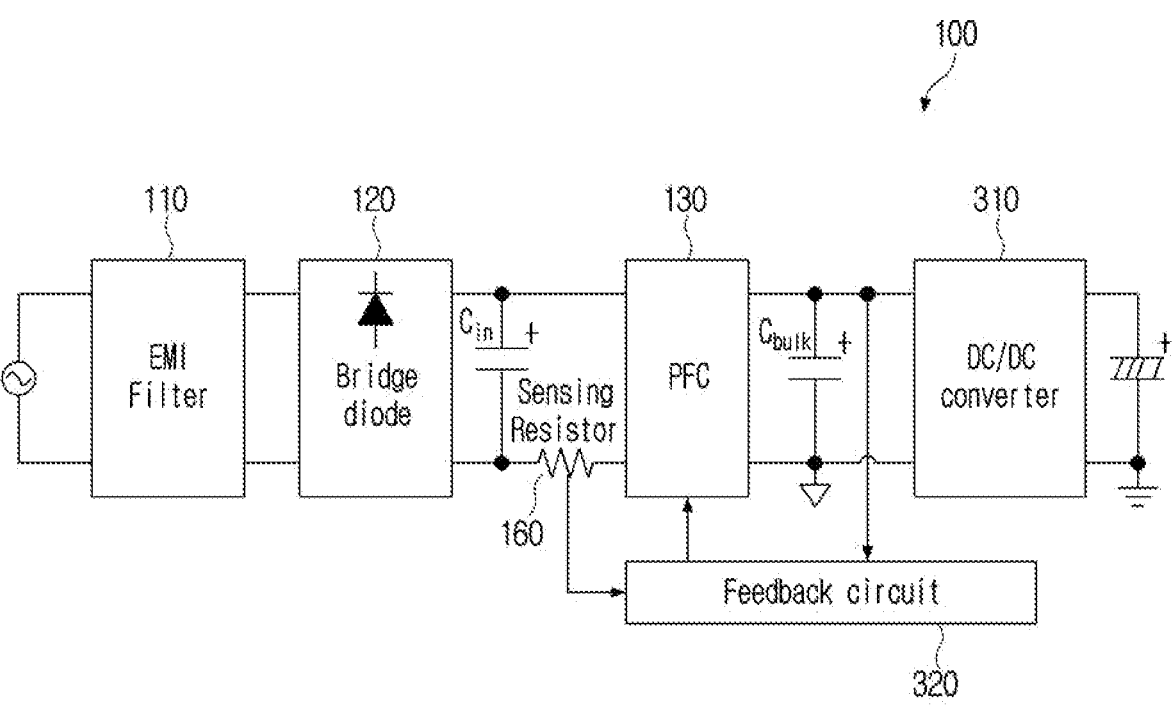
FIG. 3 is a diagram illustrating a circuit structure of an electronic apparatus according to an embodiment.

FIGS. 2 and 3 are a block diagrams illustrating example configurations of the electronic apparatus 100 according to one or more embodiments of the disclosure.

The electronic apparatus 100 may include a power circuit for receiving external power and supplying power to each component of the electronic apparatus 100. However, embodiments are not limited thereto, and the electronic apparatus 100 may be an apparatus for receiving external power and supplying power to an external device, or any apparatus capable of supplying power.

As illustrated in FIG. 2, the electronic apparatus 100 may include an EMI filter 110, a bridge diode 120, and a PFC 130.

The EMI filter 110 may filter and inhibit noise included in external power using a capacitor, inductor, reactor, or the like.

For example, the EMI filter 110 may discharge power corresponding to a spike such as a voltage spike or a current spike using a resistance, intake or discharge noise using a capacitor, or inhibit noise using an inductor.

The bridge diode 120 may be connected to an output terminal of the EMI filter 110 and output AC power as DC power by using four diodes. For example, the bridge diode 120 may be a circuit for full-wave rectification of AC power, and may also be referred to as a bridge rectifier.

The PFC 130 may be connected to an output terminal of the bridge diode 120, and may include a PFC integrated circuit (IC). Here, the PFC IC 170 may control the PFC 130 so that current flowing in an inductor 132 included in the PFC 130 may be maintained to be less than or equal to a preset or predetermined current value. For example, the predetermined current value may be less than a value of a current which flows in the inductor 132 in response to a peak voltage being applied to the PFC 130.

For example, the PFC IC 170 may control the PFC 130 to maintain a current flowing in an inductor 132 included in the PFC 130 below the predetermined current value by controlling a transistor 131 included in the PFC 130 according to a current flowing in the inductor L.

For example, the electronic apparatus 100 may further include a sensing resistor 160 disposed or connected between the bridge diode 120 and the PFC 130. In embodiments, the PFC IC 170 may turn off the transistor 131 based on the current flowing in the inductor 132 increasing and a voltage of the sensing resistor 160 reaching a predetermined voltage value corresponding to the predetermined current value. In embodiments, the PFC IC 170 may turn on the transistor 131 based on the current flowing in the inductor 132 decreasing and the voltage determined based on the sensing resistor reaching zero. When the transistor 131 is turned off, a current flowing in the inductor 132 may decrease, and when the transistor 131 is turned on, a current flowing in the inductor 132 may increase. Through this operation, a current flowing in the inductor 132 may maintain a triangular waveform between 0 and a predetermined current value.

As illustrated in FIG. 3, the DC/DC converter 310 may be connected to an output terminal of the PFC 130, and the electronic apparatus may further include a feedback circuit configured to detect an output voltage of the PFC 130 and change a voltage of the sensing resistor 160 based on an output voltage of the PFC 130 decreasing below a voltage of an allowed input range of the DC/DC converter 310. The voltage applied to the sensing resistor 160 may be a voltage obtained by resistance/capacitive (RC) filtering and voltage-dividing of a voltage of the sensing resistor 160. An example this is described in detail below with reference to FIGS. 7 and 8.

For example, when the load increases, the output voltage of PFC 130 may decrease, and based on the output voltage of the PFC gradually decreasing to be less than or equal to the allowed range of the DC/DC converter 310, the feedback circuit may gradually decrease the voltage of the sensing resistor 160, and the PFC IC 170 may increase a turn-on time of the transistor 131 as the voltage of the sensing resistor 160 decreases.

The feedback circuit may include a sensing circuit configured to output a value which gradually changes to a second value from a first value as the output voltage of the PFC 130 decreases; and a variable voltage circuit configured to change a voltage of the sensing resistor 160 based on the value output from the sensing circuit. For example, the sensing circuit may output a value of 0 when the output voltage of the PFC 130 is within the allowed input range of the DC/DC converter 310 by sensing output voltage of the PFC 130, and may gradually change the value 1 as the output voltage of the PFC 130 gradually decreases beyond the allowed input range of the DC/DC converter 310. The variable voltage circuit may gradually lower a voltage of the sensing resistor 160 based on the value output from the sensing circuit. The PFC IC 170 may turn off the transistor 131 when a voltage of the sensing resistor 160 reaches a threshold value. Here, the time until the transistor 131 is turned off may be delayed as the voltage of the sensing resistor 160 decreases. For example, the PFC IC 170 may further maintain the turn-on time of the transistor 131 as the voltage of the sensing resistor 160 decreases. When the transistor 131 is turned on further, a current flowing in the inductor 132 may be further increased, and consequently, a substantially predetermined current value may be increased.

As another example, the PFC IC 170 may change a turn-on time of a gate of a transistor 131 included in the PFC 130 to a preset method to control the PFC 130 such that a current flowing in the inductor 132 is maintained at a preset current value or less. For example, a turn-on time of a gate of a transistor 131 that allows a current flowing in an inductor 132 to maintain a triangular waveform between 0 and a predetermined current value may be obtained in advance. The PFC IC 170 may control the transistor 131 based on the obtained turn-on time to maintain a current flowing in the inductor 132 to be equal to or less than a predetermined current value.

Based on a current flowing in the inductor 132 reaching the predetermined current value during a part of a plurality of time intervals in which a gate of a transistor 131 included in the PFC 130 is turned on, the PFC IC 170 may maintain an output voltage of the PFC 130 at a predetermined voltage by increasing a turn-on time of a gate of a transistor 131 included in the PFC 130 during a remaining time interval among the plurality of time intervals. The output voltage of the PFC 130 may gradually decrease, based on the turn-on time of the gate reaching a turn-on limit time. Through this operation, the current flowing in the inductor 132 may be a triangular waveform, or the entire contour of the plurality of triangular waveforms may be changed to a rectangular waveform. An example of this is described in detail below with reference to FIGS. 4A and 4B.

The PFC 130 may further include the inductor 132 of which one end is connected to an output terminal of the bridge diode 120; a transistor 131 having a drain connected to the other end and a source grounded; a diode 133 having an anode connected to the other end of the inductor 132; and a capacitor 134 of which one end is connected to a cathode of the diode, and the other end of the capacitor is grounded.

As described above, the electronic apparatus 100 may increase the efficiency of a transistor 131 included in the PFC 130 and reduce heat generation by maintaining a current flowing in an inductor 132 included in the PFC 130 below a preset current value or below. In addition, the electronic apparatus 100 may reduce the size of the inductor 132 by lowering the peak value of the current flowing in the inductor included in the PFC 130, and thus miniaturization of the PFC 130 or the electronic apparatus 100 is possible.

For example, when magnetic flux is saturated, the inductor 132 may not serve as an inductor. Therefore, a saturation magnetic flux ($\Phi$sat) should be appropriately designed according to a power specification. The inductance (L) may be expressed by a turn number (N) wound on a magnetic body, a current (I), and a magnetic flux (0), and may be expressed according to Equation 1:

$$LI=N\Phi \qquad \text{Equation 1}$$

Here, $\Phi=BA$ where B denotes a magnetic flux density, and A denotes a cross-sectional area, and thus Equation 2 below may hold:

$$LI=NBA \qquad \text{Equation 2}$$

Since the inductor saturation current Isat may be proportional to the cross-sectional area A, if the peak current of the inductor 131 is decreased, the cross-sectional area of the inductor 131 may be reduced to reduce the overall volume of the inductor 131.

In the electronic apparatus 11 which includes a boost follower 150, the boost follower 150 may sense the input voltage and change the output voltage of the PFC 130, and thus there may be a disadvantage in that the ripple current flowing in the capacitor $C_{bulk}$ due to the loss of standby power and the change in the output voltage of the PFC 130 increases compared to related-art implementations. Therefore, in the electronic apparatus 100 which does not include the boost follower 150, no input voltage may be sensed, thereby not affecting standby power unlike the boost follower 150, and the peak current of the inductor 131 included in the PFC 130 according to the change of the output voltage of the PFC 130 may not increase, and thus the ripple current flowing in the $C_{bulk}$ may also not be increased. In addition, when the AC input voltage is changed from 90 VAC to 264 VAC, the peak may be significantly reduced unlike related-art implementations, and thus the embodiment may not burden the devices. In some countries which use a low AC input voltage there may be only regulation on power factor (PF), and no regulation to harmonics, so there may be no limitation in use of embodiments.

An example of the operation of the electronic apparatus 100 will be described in more detail below with reference to FIGS. 3 to 7. For convenience of description, a separate embodiment will be described with reference to FIGS. 3 to 7. However, the individual embodiments of FIGS. 3 to 7 may be performed in a combined state.

FIG. 3 is a diagram illustrating a circuit structure of the electronic apparatus 100 according to one or more embodiments of the disclosure.

The electronic apparatus 100 may include an EMI filter 110, a bridge diode 120, and a PFC 130. In addition, the electronic apparatus 100 may further include a DC/DC converter 310 connected to an output terminal of the PFC. The electronic apparatus 100 may further include a feedback circuit 320, which may be or may include an adaptive constant P-V control.

According to embodiments, as described above with reference to FIG. 2, the current flowing in the inductor included in the PFC 130 may be set to be lower than that of related-art implementations so that the entire contour of the current flowing in the inductor may be changed to a square waveform from a sine wave. In addition, the efficiency of the PFC 130 may be increased by lowering the output voltage of the PFC 130. Even if the output voltage of the PFC 130 is lowered as the load increases, the output voltage of the PFC 130 may be maintained within the input allowable range of the DC/DC converter 310 through the feedback circuit 320.

Figure 4A:
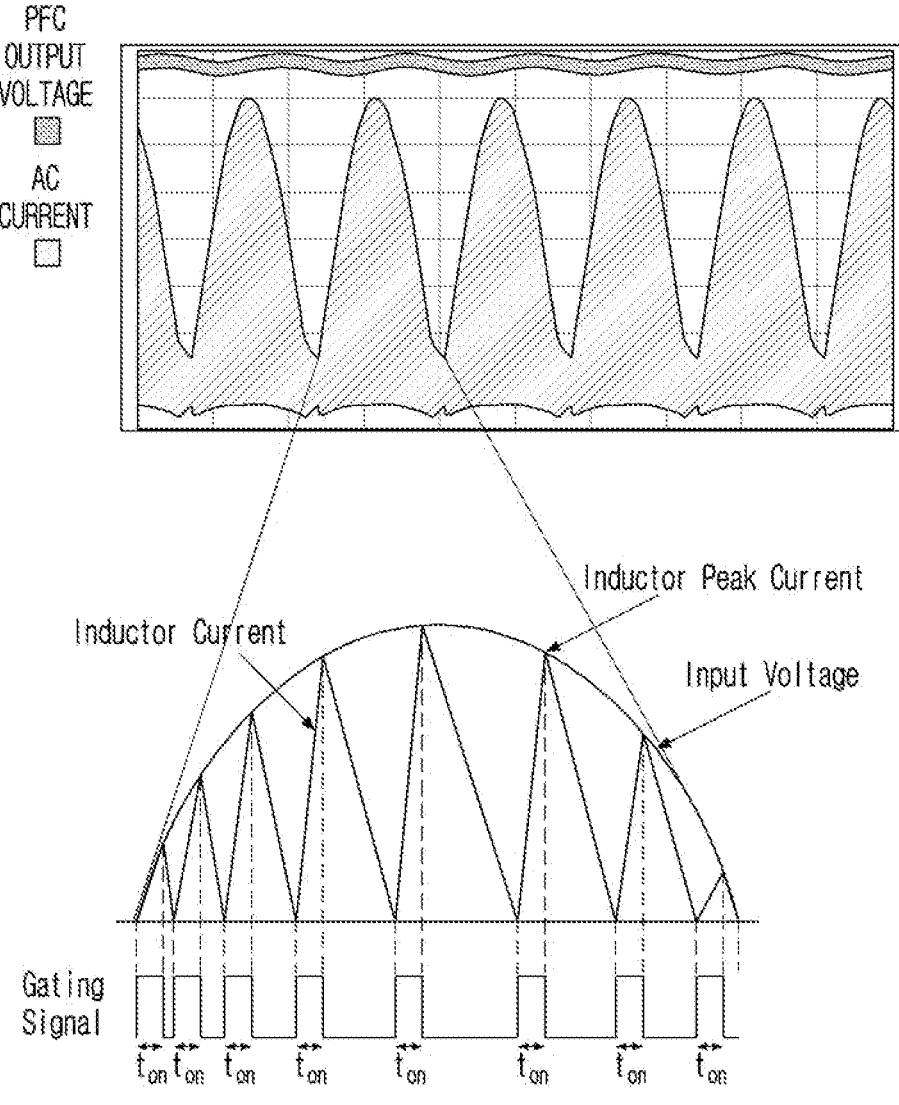
FIGS. 4A and 4B are diagrams illustrating a specific operation of an electronic apparatus 100 according to an embodiment.
Figure 4B:
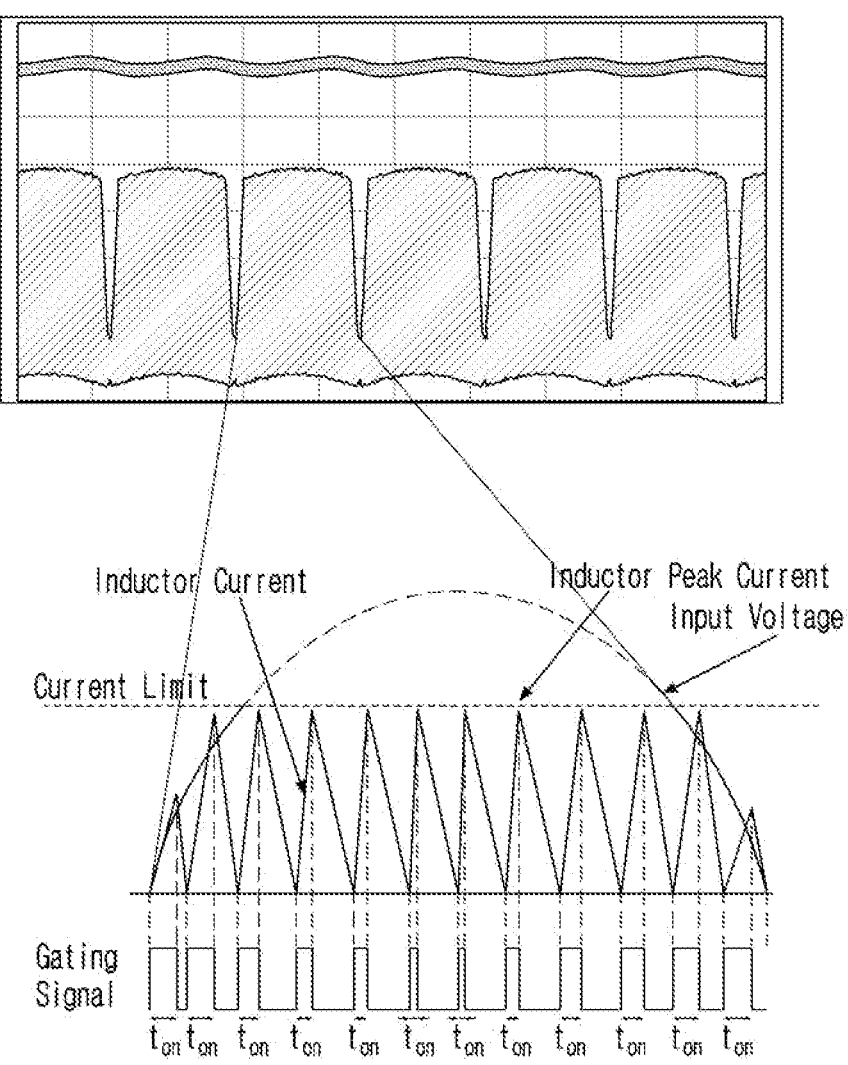

FIG. 4A is a diagram illustrating an example operation of a related art electronic apparatus according to one or more embodiments of the disclosure, and FIG. 4B is a diagram illustrating an example operation of the electronic apparatus 100 according to one or more embodiments of the disclosure.

Because the input voltage may be relatively small in the low AC input voltage region, a relatively large current may be used compared to the high AC input voltage when the load is same. As shown in FIG. 4A, the current flowing in the inductor included in a related-art PFC may follow the waveform of the input voltage, and the contour of the current flowing in the inductor included in the related-art PFC may be in the form of a sine wave as shown in the upper portion of FIG. 4A.

The current flowing in the inductor 132 included in the PFC 130 according to embodiments may be maintained at a predetermined current value or less, and thus may be a rectangular waveform as shown in the upper portion of FIG. 4B. Through this operation, the current flowing in the inductor 132 included in the PFC 130 may have a smaller peak value compared to related-art implementations, and the current of both sides may increase, such as the lower portion of FIG. 4B, so that the output voltage of the PFC 130 may be maintained at a predetermined voltage. That is, when a current flowing in the inductor 132 reaches a preset current value during a part of a plurality of time intervals in which the gate of the transistor 131 included in the PFC 130 is turned on, the PFC IC 170 may increase the turn-on time of the gate of the transistor 131 included in the PFC 130 during the remaining time intervals among the plurality of time intervals to maintain the output voltage of the PFC 130 as a preset voltage.

Because the current flowing in the inductor 132 increases at a slope proportional to the input voltage, a predetermined current value may be quickly reached in a period in which the input voltage is high. Accordingly, as shown in the lower portion of FIG. 4B, the time t on may be shorter than a section having a low input voltage. When the t on of a portion (not a square wave) having a low input voltage is a maximum value, the current flowing in the PFC 130 may be changed to a rectangular waveform as shown in the upper portion of FIG. 4B.

A peak value of a current flowing in an inductor may be determined when a peak voltage is applied to the related art PFC in FIG. 4A, and a predetermined current value in FIG. 4B may be smaller.

This operation may reduce the RMS value of the current flowing through the transistor 131 included in the PFC 130, thereby increasing the efficiency of the transistor 131 and reducing the peak value of the current flowing in the inductor included in the PFC 130, thereby securing the DC bias to reduce the size of the inductor 132.

Figure 5:
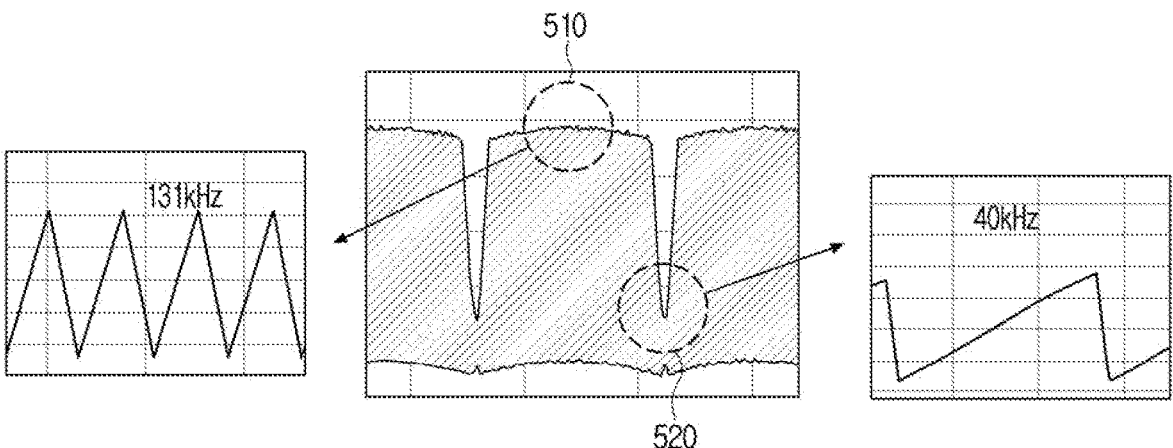
FIGS. 5, 6A, and 6B are diagrams illustrating an operation waveform according to an embodiment.

FIGS. 5 and 6 are diagrams illustrating an operation waveform according to one or more embodiments of the disclosure.

The middle portion of FIG. 5 shows the same square waveform as the upper portion of FIG. 4B, the left portion side of FIG. 5 is an enlarged view of the waveform of the current flowing in the inductor 132 in the section where the input voltage is high, and the right portion of FIG. 5 is an enlarged view of the waveform of the current flowing in the inductor 132 in the section in which the input voltage is low.

The left portion of FIG. 5 shows a peak power ring section, operating at about 131 kilohertz (kHz), and may have a very small t on due to the magnitude of $V_{in}$, having high frequency.

The right portion of FIG. 5 shows an operation at about 40 kHz as an over compensation period, and because $V_{in}$ is small, $t_{on}$ may be very large, so frequency may be low.

Figure 6A:
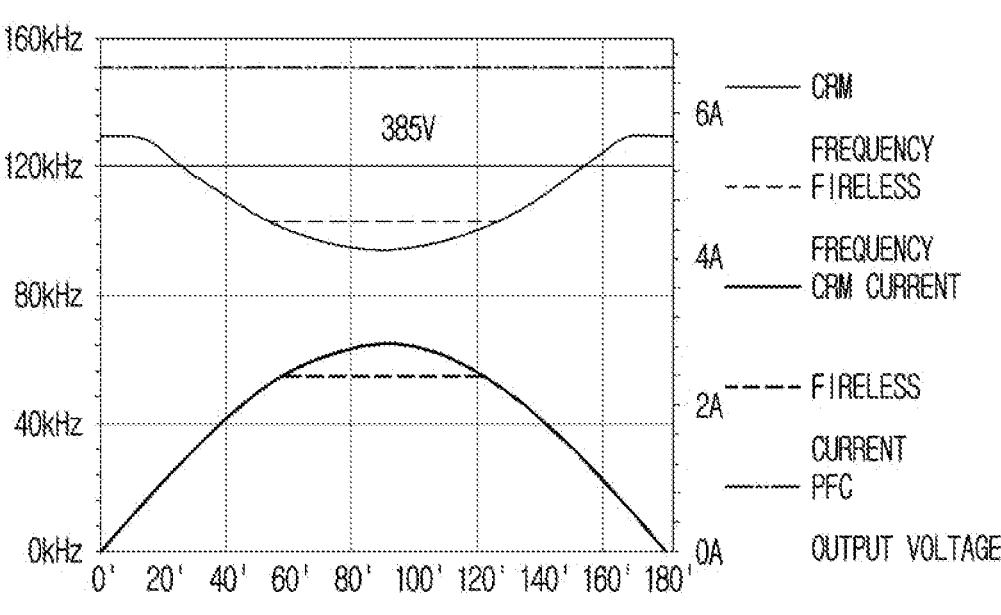
Figure 6B:
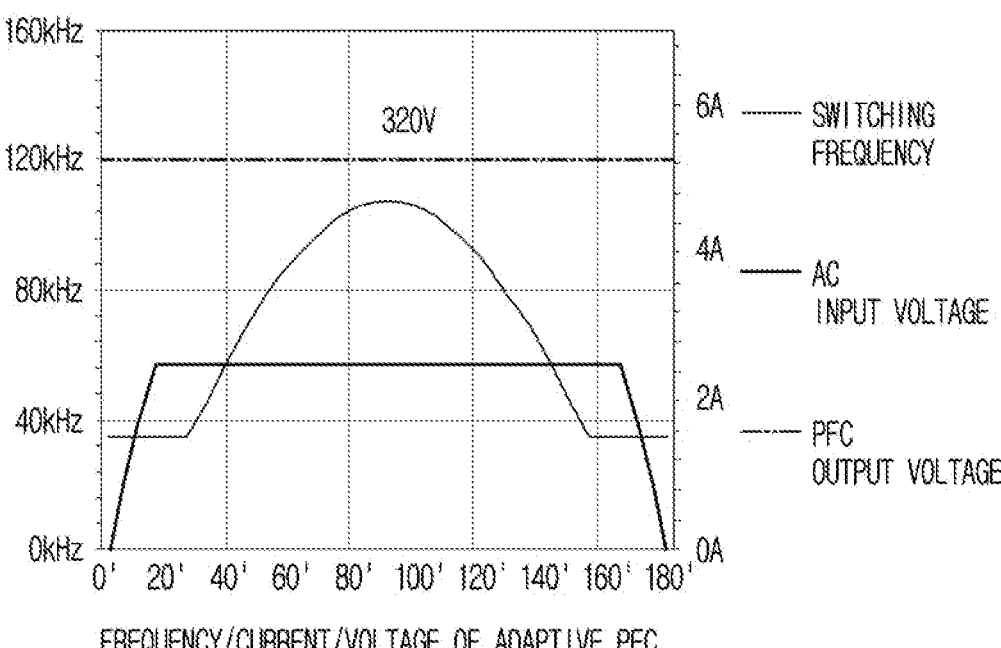

FIG. 6A shows an example operation waveform of a related-art PFC. FIG. 6B shows an example operation waveform of a PFC 130 according to embodiments.

As can be seen in FIGS. 6A and 6B, the output voltage of the PFC 130 according to embodiments may be lower than that of related-art implementations, and the switching frequency may be lowered in most sections, thereby improving efficiency.

Figure 7:
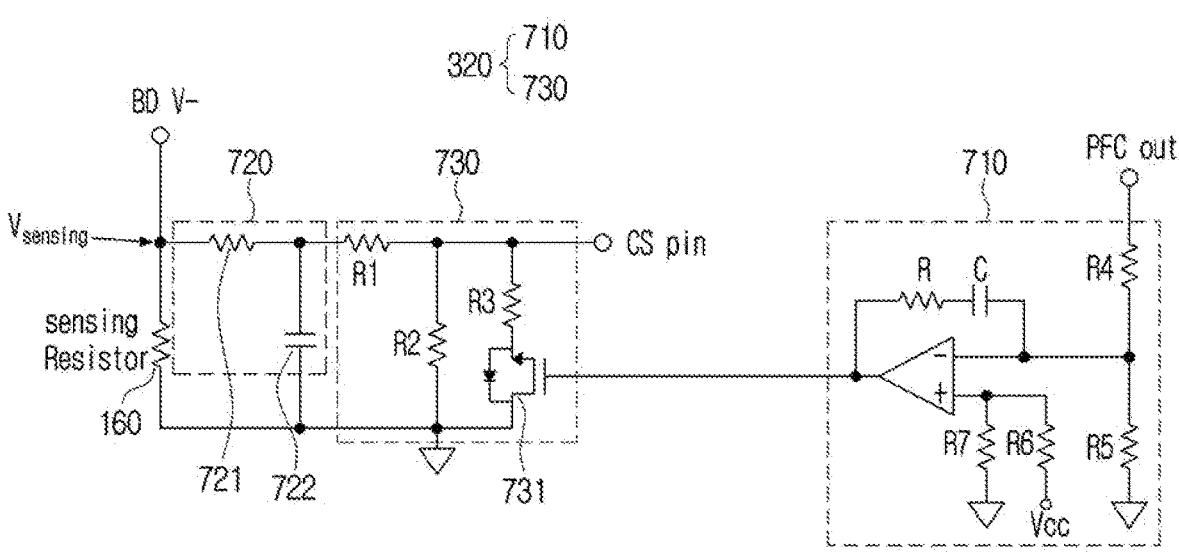
FIG. 7 is a diagram illustrating a feedback operation according to an embodiment.

FIG. 7 is a diagram illustrating a feedback operation according to one or more embodiments of the disclosure.

When a load increases as a current flowing in an inductor included in PFC 130 is a square waveform, an output voltage of the PFC 130 may be reduced. When the output voltage of the PFC 130 is reduced, the loss of the transistor 131 included in the PFC 130 may be reduced. For example, when the output voltage of the PFC 130 is reduced, the characteristics of the PFC 130 may be improved, but the characteristics of the DC/DC converter 310 connected to the PFC 130 may be deteriorated, and when the output voltage of the PFC 130 decreases below the allowable input range of the DC/DC converter, the DC/DC converter may not be able to operate. In order to prevent this, a feedback circuit may be added, for example the feedback circuit 320. First, for convenience of description, a configuration in which there is no feedback circuit will be described.

The PFC IC 170 may include a CS pin, and when there is no feedback circuit, a node between the resistor 721 and the capacitor 722 may be connected to a CS pin in an RC filter 720 connected to the sensing resistor 160 arranged between the bridge diode 120 and the PFC 130. Here, the voltage sensed by the CS pin may be referred to as a voltage of the sensing resistor 160.

When the current flowing in the inductor included in PFC 130 increases, the absolute value of the voltage of the sensing resistor 160 may also be increased, and when the current flowing in the inductor included in the PFC 130 decreases, the absolute value of the voltage based on the sensing resistor 160 may also be reduced. When the voltage of the sensing resistor 160 sensed by the CS pin is 0, the PFC IC 170 may turn on the transistor 131 included in the PFC

130. Further, when the voltage of the sensing resistor 160 reaches a threshold voltage, the PFC IC 170 may turn off the transistor 131 included in the PFC 130. When the transistor 131 is turned on, a voltage of the sensing resistor 160 may increase, and when the transistor 131 is turned off, a voltage of the sensing resistor 160 may decrease. Through this operation, the PFC IC 170 may maintain the current flowing in the inductor 132 included in the PFC 130 below a preset current value.

If the load is not significantly changed when there is no feedback circuit, the PFC 130 may operate normally. However, if the load is increased, the output voltage of the PFC 130 may gradually decrease. In this case, the PFC IC 170 may sense an output voltage of the PFC 130 and increase a turn-on time of a gate of a transistor 131 included in the PFC 130 during a partial time period to maintain an output voltage of the PFC 130.

However, the turn-on time of the gate of the transistor 131 included in the PFC 130 may have a turn-on limit time, and when the load further increases, the output voltage of the PFC 130 may be gradually lowered.

In this case, the feedback circuit 320 may change the voltage of the sensing resistor 160 if the output voltage of the PFC 130 is reduced below the voltage of the allowed input range of the DC/DC converter 310. For example, the feedback circuit 320 may include a sensing circuit 710 for gradually changing an output value to a second value from a first value as the output voltage of the PFC 130 frequency decreases; and a variable voltage circuit 730 for changing the voltage of the sensing resistor 160 based on the value output from the sensing circuit 710. In embodiments, the variable voltage circuit 730 may include an amplifier, a capacitor C, and resistors R, R4, R5, R6, and R7.

For example, the sensing circuit 710 may output a value gradually increasing from 0 to 1 when the output voltage of the PFC 130 is reduced, and the variable voltage circuit 730 may be connected to the RC filter 720 to distribute a voltage. The R2 resistor of the variable voltage circuit 730 may be much larger than the R1 and R3 resistors, and when the sensing circuit 710 outputs 0, the transistor 731 serially connected to the R3 resistor may be opened, so that the most part of the node voltage between the resistor 721 and the capacitor 722 of the RC filter 720 may be applied to the R2 resistor. When the sensing circuit 710 outputs a value gradually increasing from 0 to 1, the transistor 731 serially connected to the R3 resistor may be turned on so that the R2 resistor and the R3 resistor may be in a parallel connection state, and only a part of the node voltage between the resistor and the capacitor of the RC filter 720 may be applied to the R2 resistor. Accordingly, when the sensing circuit 710 outputs a value gradually increasing from 0 to 1, the voltage applied to the R2 resistor may gradually decrease.

Because the voltage applied to the R2 resistor, for example the voltage of the sensing resistor 160, is reduced, the PFC IC 170 may increase the turn-on time of the transistor 131 included in the PFC 130. For example, the PFC IC 170 may maintain the turn-on of the transistor 131 included in the PFC 130 until the voltage applied to the R2 resistor reaches the threshold voltage, and the turn-on time of the transistor 131 included in the PFC 130 may be increased as the voltage applied to the R2 resistor is lowered. Accordingly, the current flowing in the inductor 132 included in the PFC 130 may be further increased, and consequently, there may be an effect that a predetermined current value may be substantially increased. In addition, as the current flowing in the inductor 131 included in the PFC 130 increases further, an output voltage of the PFC 130 may also increase to be maintained within an allowed input range of the DC/DC converter.

Figure 8:
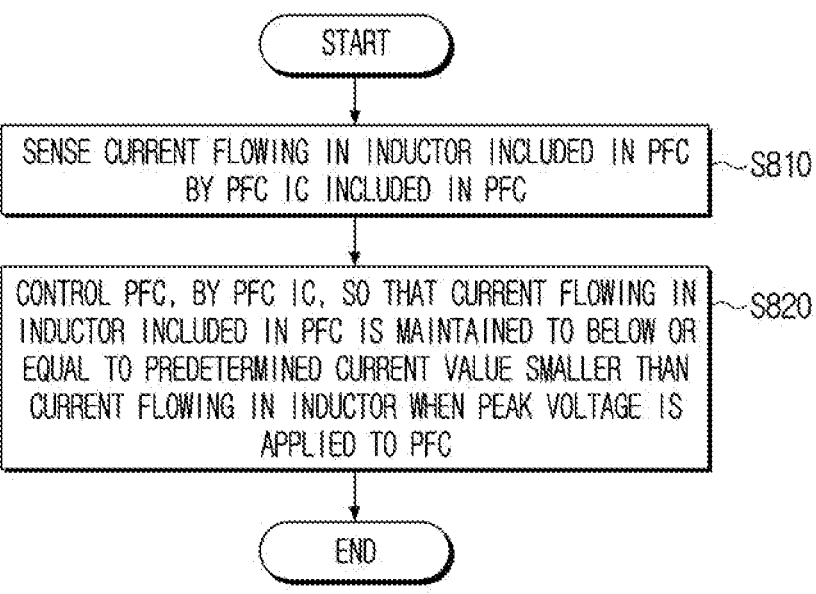
FIG. 8 is a flowchart illustrating a control method of an electronic apparatus according to an embodiment.

FIG. 8 is a flowchart illustrating a control method of an electronic apparatus according to one or more embodiments of the disclosure.

First, current flowing in an inductor included in the PFC is sensed by a PFC IC 170 included in the PFC 130 in operation S810. Next, the PFC 130 may be controlled by the PFC IC 170, so that current flowing in an inductor 132 included in the PFC 130 may be maintained below or equal to a predetermined current value, which may be smaller than a current flowing in the inductor 132 in response to a peak voltage being applied to the PFC 130 in operation S820.

The controlling in operation S820 may include controlling the PFC 130 to maintain a current flowing in an inductor included in the PFC 130 below the preset current value by controlling a transistor 131 included in the PFC 130 according to a current flowing in the inductor.

The controlling S820 may include, based on the current flowing in the inductor increasing and a voltage based on the sensing resistor 160 reaching a predetermined voltage value corresponding to the predetermined current value, turning off the transistor 131, and based on a current flowing in the inductor decreasing and a voltage of the sensing resistor 160 reaching zero, turning on the transistor 131.

The method may further include detecting an output voltage of the PFC and changing a voltage of the sensing resistor 160 when an output voltage of the PFC decreases below a voltage of an input allowable range of the DC/DC converter 310.

The changing in operation S820 may include, based on the output voltage of the PFC 130 gradually decreasing to be less than or equal to the allowed input range of the DC/DC converter 310, gradually decreasing the voltage based on the sensing resistor 160, and the controlling in operation S820 may include increasing a turn-on time of the transistor 131 as the voltage as the sensing resistor 160 decreases.

The changing may include gradually changing an output value to a second value from a first value as the output voltage of the PFC decreases; and changing a voltage of the sensing resistor 160 based on the output value output from the sensing circuit 710.

The controlling in operation S820 may include controlling the PFC to maintain a current flowing in the inductor to be less than or equal to the preset current value by changing a turn-on time of a gate of a transistor 131 included in the PFC to a predetermined method.

The controlling in operation S820 may include, based on a current flowing in the inductor reaching the preset current value during a part of a plurality of time intervals in which a gate of a transistor 131 included in the PFC is turned on, maintaining an output voltage of the PFC at a preset voltage by increasing a turn-on time of a gate of a transistor 131 included in the PFC 130 during a remaining time interval among the plurality of time intervals.

The output voltage of the PFC 130 may gradually decrease, based on the turn-on time of the gate reaching a turn-on limit time.

The PFC 130 may further include the inductor 132; a transistor 131 having a drain connected to the other end and a source grounded; a diode 133 having an anode connected to the other end of the inductor 132; and a capacitor 134 of which one end is connected to a cathode of the diode 133, and the other end of the capacitor is grounded.

According to various embodiments of the disclosure, an electronic apparatus 100 may maintain a current flowing in an inductor 132 included in a PFC 130 below a predetermined current value to increase the efficiency of a transistor 131 included in the PFC 130 and reduce heat generation.

The electronic apparatus 100 may reduce the size of the inductor 132 by lowering the peak value of current flowing in the inductor included in the PFC 130, thereby allowing the size of the PFC 130 or the electronic apparatus 100 to be reduced.

Embodiments described above may be implemented as software including instructions stored in a machine-readable storage media which is readable by a machine (e.g., a computer). The device may include an electronic apparatus (e.g., electronic apparatus A) according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to one or more embodiments, the methods described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product (e.g., downloadable app) may be at least temporarily stored or provisionally generated on the storage media such as a manufacturer's server, the application store's server, or a memory in a relay server.

Embodiments described above may be implemented in a recordable medium which is readable by a computer or a device similar to the computer using software, hardware, or the combination of software and hardware. In some cases, example embodiments described herein may be implemented by the processor itself. According to a software implementation, example embodiments such as the procedures and functions described herein may be implemented with separate software modules. Each of the software modules may perform one or more of the functions and operations described herein.

According to embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to embodiments may be comprised of a single entity or a plurality of entities, and some sub-elements of the abovementioned sub-elements may be omitted, or different sub-elements may be further included in the various example embodiments. Alternatively or additionally, some elements (e.g., modules or programs) may be integrated into one entity to perform the same or similar functions performed by each respective element prior to integration. Operations performed by a module, a program, or another element, in accordance with various example embodiments, may be performed sequentially, in a parallel, repetitively, or in a heuristically manner, or at least some operations may be performed in a different order, omitted or a different operation may be added.

While example embodiments have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic apparatus comprising:
an electromagnetic interference (EMI) filter;
a bridge diode connected to an output terminal of the EMI filter;
a power factor correction (PFC) connected to an output terminal of the bridge diode, and comprising a PFC integrated circuit (IC);
a sensing resistor connected between the bridge diode and the PFC; and
a feedback circuit configured to detect an output voltage of the PFC and change a voltage of the sensing resistor based on the output voltage of the PFC decreasing below a predetermined voltage range,
wherein the PFC IC is configured to control an inductor current which flows in an inductor included in the PFC to be less than or equal to a predetermined current value, and
wherein the predetermined current value is smaller than a current value of a current which flows in the inductor based on a peak voltage being applied to the PFC.

2. The electronic apparatus of claim 1, wherein the PFC IC is further configured to control the PFC to maintain the inductor current to be less than or equal to the predetermined current value by changing a turn-on time of a gate of a transistor included in the PFC.

3. The electronic apparatus of claim 1, wherein the PFC further comprises a transistor, a diode, and a capacitor,
wherein a first end of the inductor is connected to the output terminal of the bridge diode,
wherein a drain of the transistor is connected to a second end of the inductor, and a source of the transistor is grounded;
wherein an anode of the diode is connected to the second end of the inductor; and
wherein a first end of the capacitor is connected to a cathode of the diode, and a second end of the capacitor is grounded.

4. The electronic apparatus of claim 1, wherein the PFC IC is further configured to:
based on the inductor current reaching the predetermined current value during a first time interval from among a plurality of time intervals in which a gate of a transistor included in the PFC is turned on, maintain an output voltage of the PFC at a predetermined voltage by increasing a turn-on time of the gate of the transistor included in the PFC during a second time interval from among the plurality of time intervals.

5. The electronic apparatus of claim 4, wherein the output voltage of the PFC decreases, based on the turn-on time of the gate reaching a turn-on limit time.

6. The electronic apparatus of claim 1, wherein the PFC IC is further configured to control the inductor current by controlling a transistor included in the PFC according to the inductor current.

7. The electronic apparatus of claim 6,
wherein the PFC IC is further configured to:
turn off the transistor based on the inductor current increasing and a voltage of the sensing resistor reaching a predetermined voltage value corresponding to the predetermined current value; and
turn on the transistor based on the inductor current decreasing and the voltage of the sensing resistor reaching zero.

8. The electronic apparatus of claim 7, further comprising:
a direct current to direct current (DC/DC) converter connected to an output terminal of the PFC,
wherein the feedback circuit is further configured to change the voltage of the sensing resistor based on the output voltage of the PFC decreasing below an allowed input range of the DC/DC converter.

9. The electronic apparatus of claim 8, wherein the feedback circuit is further configured to decrease the voltage of the sensing resistor based on the output voltage of the PFC decreasing to be less than or equal to the allowed input range, and
wherein the PFC IC is further configured to increase a turn-on time of the transistor as the voltage of the sensing resistor decreases.

10. The electronic apparatus of claim 8, wherein the feedback circuit comprises:
a sensing circuit configured to output an output value, and to change the output value to a second output value from a first output value based on the output voltage of the PFC decreasing; and
a variable voltage circuit configured to change the voltage of the sensing resistor based on the output value.

11. A method of controlling an electronic apparatus, the method comprising:
sensing an inductor current which flows in an inductor included in a power factor correction (PFC) of the electronic apparatus, by a PFC integrated circuit (IC) included in the PFC;
controlling, by the PFC IC, the inductor current is maintained to be less than or equal to a predetermined current value;
detecting an output voltage of the PFC; and
changing a voltage of a sensing resistor based on the output voltage of the PFC decreasing below a predetermined voltage range,
wherein the predetermined current value is smaller than a current value of a current which flows in the inductor based on a peak voltage being applied to the PFC.

12. The method of claim 11, wherein the controlling of the inductor current comprises controlling a transistor included in the PFC according to the current flowing in the inductor.

13. The method of claim 12, wherein the controlling of the transistor comprises:
turning off the transistor based on the inductor current increasing and the voltage of the sensing resistor reaching a predetermined voltage value corresponding to the predetermined current value; and turning on the transistor based on the inductor current decreasing and the voltage of the sensing resistor reaching zero.

14. The method of claim 13, further comprising:

changing the voltage of the sensing resistor based on the output voltage of the PFC decreasing below an allowed input range of a direct current to direct current (DC/DC) converter.

15. The method of claim 14, wherein the changing comprises decreasing the voltage of the sensing resistor based on the output voltage of the PFC decreasing to be less than or equal to the allowed input range, and wherein the controlling comprises increasing a turn-on time of the transistor as the voltage as the sensing resistor decreases.

* * * * *